US009432719B2

(12) United States Patent
Neuman et al.

(10) Patent No.: US 9,432,719 B2
(45) Date of Patent: Aug. 30, 2016

(54) A/V SYSTEM AND METHOD SUPPORTING A PULL DATA FLOW SCHEME

(75) Inventors: Darren Neuman, San Jose, CA (US); Brian Schoner, Fremont, CA (US)

(73) Assignee: BROADCOM CORPORATION, Irvine, CA (US)

( * ) Notice: Subject to any disclaimer, the term of this patent is extended or adjusted under 35 U.S.C. 154(b) by 3048 days.

(21) Appl. No.: 10/300,234

(22) Filed: Nov. 20, 2002

(65) Prior Publication Data
US 2004/0075767 A1 Apr. 22, 2004

Related U.S. Application Data

(60) Provisional application No. 60/420,342, filed on Oct. 22, 2002.

(51) Int. Cl.
| H04N 7/12 | (2006.01) |
| H04N 21/43 | (2011.01) |
| H04N 5/44 | (2011.01) |
| H04N 5/50 | (2006.01) |
| H04N 21/426 | (2011.01) |
| H04N 21/431 | (2011.01) |

(52) U.S. Cl.
CPC ......... *H04N 21/4305* (2013.01); *H04N 5/4401* (2013.01); *H04N 5/50* (2013.01); *H04N 21/4263* (2013.01); *H04N 21/4316* (2013.01)

(58) Field of Classification Search
CPC .......... H04N 21/4305; H04N 21/4307; H04N 21/44004; H04N 21/64307; H04N 21/242; H04N 21/4345
USPC ............. 375/240.28, 240.15, 240.25, 240.26; 348/497, 500, 512, 506, 507, 508; 725/60, 32
See application file for complete search history.

(56) References Cited

U.S. PATENT DOCUMENTS

| 5,287,182 | A | * | 2/1994 | Haskell et al. ................. 348/500 |
| 5,453,790 | A | * | 9/1995 | Vermeulen ............ H04J 3/0632 |
| | | | | 375/240.12 |
| 5,481,543 | A | * | 1/1996 | Veltman ............... H04N 5/9206 |
| | | | | 348/423.1 |
| 5,543,853 | A | * | 8/1996 | Haskell et al. ................ 375/240.28 |
| 5,565,924 | A | * | 10/1996 | Haskell et al. ............. 348/423.1 |
| 5,664,044 | A | * | 9/1997 | Ware .................... G10H 1/0033 |
| | | | | 348/E5.014 |
| 5,844,600 | A | * | 12/1998 | Kerr ........................... 348/14.12 |
| 5,881,245 | A | * | 3/1999 | Thompson ............... H04N 7/52 |
| | | | | 375/E7.014 |
| 5,920,572 | A | * | 7/1999 | Washington ....... H04N 21/4181 |
| | | | | 348/476 |
| 6,101,591 | A | * | 8/2000 | Foster et al. .................. 711/219 |
| 6,337,883 | B1 | * | 1/2002 | Tanaka ..................... 375/240.25 |
| 6,357,042 | B2 | * | 3/2002 | Srinivasan et al. .............. 725/32 |
| 6,429,902 | B1 | | 8/2002 | Cohen et al. |
| 6,493,832 | B1 | * | 12/2002 | Itakura ............... H04N 21/2368 |
| | | | | 375/E7.025 |
| 6,512,884 | B1 | * | 1/2003 | Sawada ................ H04N 9/8063 |
| | | | | 348/423.1 |

(Continued)

FOREIGN PATENT DOCUMENTS

WO WO/01/22736 3/2001

*Primary Examiner* — Tung Vo

(74) *Attorney, Agent, or Firm* — Foley & Lardner LLP

(57) ABSTRACT

Systems and methods are disclosed for supporting a pull data flow scheme in an A/V decoder. One method relates to processing data using an A/V decoder comprising receiving the data from a data stream and recovering a system time reference from the received data. The received data is processed using a clock asynchronous to the system time reference and pulled into an output device using a system adapted to support a pull data flow. The processed data is output using a time reference locked to the system time reference.

18 Claims, 7 Drawing Sheets

(56) References Cited

U.S. PATENT DOCUMENTS

| | | | |
|---|---|---|---|
| 6,661,846 B1 * | 12/2003 | Ota | H03L 7/16 348/537 |
| 6,779,198 B1 * | 8/2004 | Morinaga | H04N 21/4147 348/423.1 |
| 6,807,191 B2 * | 10/2004 | Fujii | H04N 5/4401 348/E5.005 |
| 6,914,637 B1 * | 7/2005 | Wolf | H04L 1/203 348/473 |
| 7,174,560 B1 * | 2/2007 | Crinon | 725/60 |
| 7,188,353 B1 * | 3/2007 | Crinon | 725/32 |
| 8,015,584 B2 * | 9/2011 | Breen | H04N 7/17318 725/86 |
| 2003/0066094 A1 * | 4/2003 | van der Schaar | H04N 21/4302 725/151 |
| 2004/0073930 A1 * | 4/2004 | Demas et al. | 725/71 |
| 2004/0177162 A1 * | 9/2004 | Wetzel et al. | 709/248 |

\* cited by examiner

A/V SYSTEM AND METHOD SUPPORTING A PULL DATA FLOW SCHEME

CROSS-REFERENCE TO RELATED APPLICATIONS

This application is related to, and claims benefit of and priority from, Provisional Application No. 60/420,342 dated Oct. 22, 2002, titled "A/V System and Method Supporting A Pull Data Flow Scheme", the complete subject matter of which is incorporated herein by reference in its entirety.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

The present invention relates to a data flow scheme for decoders adapted to process data. More specifically, the present invention relates to a data flow scheme in an A/V system using "A/V decoders", where the A/V decoders are adapted to process, decode or decompress one or more input data streams (alternatively referred to as "input data", "input data streams" or "data streams") that are coded or compressed using a compression format. It is further contemplated that the A/V system has a clocking scheme that is independent or asynchronous of the clocking scheme of the input data streams.

Currently, a plurality of formats or techniques is used to compress audio-video programs for transmission and storage. See, for example, the compression standards set forth in ISO/EC IS 13818-1,2,3: Information Technology-Generic Coding of Moving Pictures and Associated Audio Information: Systems, Video and Audio (alternatively referred to as "MPEG-2") including Annex D thereof (alternatively referred to as "Annex D"); ISO/EC IS 11172-1,2,3: Information Technology-Generic Coding of Moving Pictures and Associated Audio for Digital Storage Media at up to about 1.5 Mbits/sec: Systems, Video and Audio (alternatively referred to as "MPEG-1"); Dolby AC-3; Motion JPEG, etc, each of which is incorporated herein by reference in its entirety.

Currently available A/V decoders generally include one or more clock devices. These clock devices ensure that the output of the audio and video samples, data or other information (collectively referred to as "data") is output at the same rate the data is received and input into the A/V decoder. For example, currently available A/V decoders are based on MPEG-2 transport of data. To ensure proper operation of such A/V decoders (and any larger A/V system incorporating such A/V decoders) the data output rate of the A/V decoder must match the data input rate of the A/V decoder to prevent overflow or underflow of the A/V decoder buffers. This means that the output video frame rate of the A/V decoder must match its compressed input frame rate and the output audio sample rate of the A/V decoder must match its compressed input audio sample rate.

To accomplish such synchronization in known A/V system, MPEG-2 transport synchronizes the transmitter (the headend in an A/V system for example) and the receiver (the A/V decoder in an A/V system for example) using a system time clock (alternatively referred to as an "STC", which may comprise a common 27 MHz clock for example. Further, the transmitter transmits or communicates one or more program clock references (alternatively referred to as "PCR") to the receiver. The receiver uses the one or more PCRs to synchronize itself with the transmitter.

Such synchronization in the A/V system may be accomplished using a phase-locked loop (alternatively referred to as a "PLL"). Typically the receivers include a local clock (for example a voltage-controlled oscillator, alternatively referred to as a "VCO"). The receiver compares its local clock to the PCR. If the receiver's local clock is slower than or behind the PCR, the receiver accelerates the local clock. If the receiver's local clock is faster than or ahead of the PCR, the receiver decelerates the local clock. It is contemplated that eventually, the receiver's local clock is synchronized with the STC. Subsequently, the MPEG transport synchronizes the video and audio to the STC. It is further contemplated that most video and audio frames include a presentation time stamp (alternatively referred to as "PTS") and/or a decode time stamp (alternatively referred to as "DTS"). The receiver (the A/V decoder for example) may use such PTS and/or DTS stamps to determine when to decode and display each frame relative to the STC.

It is further contemplated that the local clock (the VCO for example) is used to clock one or more audio/video digital-to-analog converters (alternatively referred to as "DACs") in the A/V decoders. Using the local clock to clock the one or more DACS ultimately determines the video frame rate and audio sample rate at the output of the A/V decoder. Since the local clock is locked to the STC, the output rates of the A/V decoder are thus locked to the transmitter.

However, A/V systems are growing more complex, requiring that A/V decoders integrate more features. A complex A/V decoder may decode several streams simultaneously, requiring several different local clocks. For example one set-top box including a decoder may support two televisions. Each television may display different programs. It is contemplated that each television may be able to support picture-in-picture (alternatively referred to as "PIP"), such that each television may display two different programs simultaneously. In this example, the set-top box may also decode another program to record for future playback. It is contemplated that different local clocks are used to clock all these programs. Furthermore, a complex A/V decoder may require additional synchronous clocks for DRAM and/or internal interfaces (DVI, Ethernet and USB for example).

Typically, existing A/V decoders rely on VCOs for A/V decoding and processing. Advanced A/V decoders with picture-in-picture or PIP or multiple displays may require several VCOs. However, high quality VCOs are expensive. Using a plurality of VCOs in the A/V decoder will affect its production costs and ultimately its retail price. It is contemplated that using multiple clocks (e.g., VCOs) may complicate decoder design. For example, clock balancing, static timing analysis and asynchronous data transfer in the AN decoder are all affected by multiple clocks. Further, it is known that currently available VCOs may lock to other system clocks (which is sometimes referred to as "injection locking"). Therefore, using multiple VCOs in an A/V decoder may cause such VOC to become locked, ultimately affecting the performance of the AN decoders.

VCOs are analog components. This means that performance of each VCO may vary depending on the temperature, process and manufacturer. This variance makes designing A/V decoders using such VCOs difficult. Additionally, sharing hardware (video scaler for example) in the A/V decoder is difficult, if such hardware is run at the STC clock rate.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Features of the present invention may be found in an A/V system and method supporting a pull data flow scheme for an A/V decoder. The system and method supporting such a pull data flow may be used to supply pixel or data as requested.

One embodiment of the present invention relates to an A/V decoder using digital signal processing rather than the VCOs to control the system timing, where the A/V decoder may be run using a single inexpensive fixed crystal clock. An exemplary embodiment of the present invention comprises a dataflow protocol adapted to control the rate of all audio/video processing in the A/V decoder.

One embodiment of the present invention relates to a method of transferring a data stream in an A/V decoder having at least one module. This method comprises receiving the data stream having predefined timing information, requesting the data stream from a module in the decoder and controlling a data rate of receipt of the data stream independently of the predefined timing information. In this embodiment, the data rate is controlled by an output of the A/V decoder. Furthermore, if the data is video data, it is transferred using a video bus protocol.

Another embodiment relates to a method of processing data in an A/V decoder. This method comprises recovering timing information from an input stream containing data and requesting data from a module in the A/V decoder. The data rate of the data request is controlled using an output stream of the A/V decoder, where the rate of the output stream is controlled using the recovered timing information. It is further contemplated that the timing information is controlled using a clock asynchronous to the recovered timing information. Furthermore, at least one module is adapted to process the data using the asynchronous clock, and at least one module in the A/V decoder requests data from a previous module.

Yet another embodiment relates to a method of processing data using an A/V decoder. This method comprises receiving the data from a data stream and recovering a system time reference (alternately referred to as "STR") from the received data. The received data is processed using a clock asynchronous to the system time reference. The processed data is pulled into an output device using a system adapted to support a pull data flow, and output using a time reference locked to the system time reference.

Another embodiment relates to an A/V decoder used to process data. This decoder comprises a recovery module adapted to recover a time reference using a clock asynchronous to the time reference and a conversion module adapted to convert the data from a push format to a pull format using the time reference. The decoder further includes a system adapted to support pull data flow. In this embodiment, the conversion device is clocked using the asynchronous clock. A process module is contemplated (to decode the data for example) where, in one embodiment, the process module is adapted to process the data using the asynchronous clock.

Still another device relates to a decoder adapted to process data in a data stream. This device comprises a recovery device adapted to recover one of a clock or clock reference from the data in the data stream using a clock asynchronous to the clock or clock reference and a transfer system adapted to support a pulled data flow scheme. An output device is adapted to pull the processed data and output it at a data rate that is locked to the recovered clock or clock reference.

These and other advantages and novel features of the present invention, as well as details of an illustrated embodiment thereof, will be more fully understood from the following description and drawings.

DETAILED DESCRIPTION OF THE INVENTION

The following description is made with reference to the appended figures.

As VCXO-based A/V systems increase in complexity, integrating more functionality, the number of clocks in such systems increase. The large number of clock domains greatly complicates compensating for delays in processing data or pixels.

One embodiment of the present invention relates to an A/V decoder using digital signal processing rather than the VCOs to control the system timing, where the A/V decoder may be run using a single inexpensive fixed crystal clock. An exemplary embodiment of the present invention comprises a dataflow protocol adapted to control the rate of all audio/video processing in the A/V decoder.

In accordance with the present invention, the output sample rate is independent of the system clock rate (i.e., the system clock is fixed, while the output data rate is variable) However, because the sample rate is variable, data processing may not rely on the system clock for timing. As an example, in a traditional MPEG system, a graphics unit may output a pixel every 2 clocks. Since the clock is synchronous with the display, the graphics pixel rate will always match the output display rate.

Figure 1:
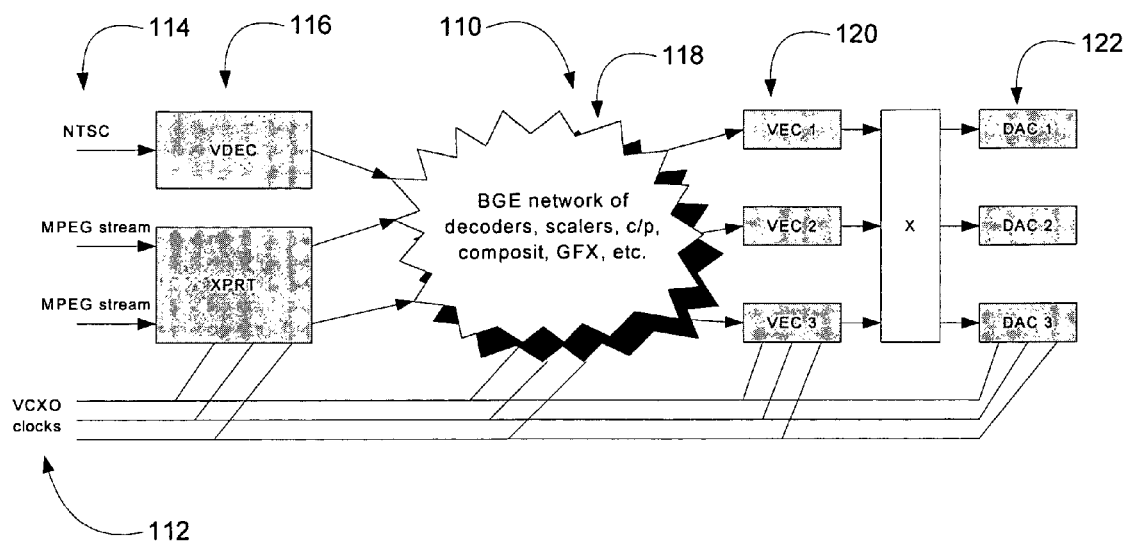
FIG. 1 illustrates a block diagram of one example of a VCXO-based video system.

However, in accordance with one embodiment of invention, only the output sample rate conversion knows the correct output data rate. In one embodiment, the data processing device uses digital protocols (i.e., handshakes) so that the output "pulls" data at the correct rate from each data processing module FIG. 1 illustrates a block diagram of one example of such a prior-art VCXO-based video system, generally designated 110. The plurality of VCXO clocks 112 is muxed into every module including the network 118, here comprised of one or more decoders, scalers, video capture & playback (alternatively referred to as "c/p"), composite, graphics (alternatively referred to as "GFX"), etc.

The input data streams 114, here comprising NTSC and one or more MPEG steams for example, use the clocks 112 for program clock reference or PCR recovery. The video decoders (alternatively referred to as "VDEC") and MPEG transport (alternatively referred to as "XPRT"), both generally designated 116, use the clocks 112 for PTS comparison, while the Video encoders (alternatively referred to as "VECs") and video digital to analog converters (alternatively referred to as "DACs"), generally designated 120 and 122 respectively, output data at the correct clock rates. It is contemplated that the VECs 120 and DACs 122 require considerable clock or reference muxing to support SCART/composite/component outputs. Such clock or reference muxing complicates the system 110 layout, STA, and scan. Furthermore, clock or reference muxing may cause glitches on the clocks 112.

Such previously known VXCO-based systems use a synchronous data flow. Such synchronous data flow requires that all the modules in a data path of such systems be synchronized to a master timing controller (alternatively referred to as a "CRTC". Data from all sources (e.g., graphic feeders, etc.) must arrive at a device (a video controller for example) at the correct clock cycle. Any processing delays must be compensated for or artifacts may appear in the output.

One embodiment of the present invention simplifies both the back-end and front-end design of the A/V systems, including the data flow scheme between different modules in the A/V decoders. One embodiment of the present invention relates to a method of decoding MPEG video for example using an A/V decoder incorporating an A/V system and method supporting pull data flow in accordance with the present invention. In this embodiment, system time references are recovered from input data streams and the output rates are controlled using such recovered system time references. One or more audio/video decoders in the A/V decoder determine when to decode each frame compliant with MPEG standards. In this embodiment, the audio/video decoders compare a time stamp (e.g., PTS/DTS) with the system time reference. Such PTS/DTS comparison is defined in the MPEG standards.

One embodiment of the present invention relates to an A/V decoder device that decodes one or more input data streams with multiple output rates using a single clock reference. This embodiment enables A/V decoders with multiple time bases to be implemented using a single clock reference (alternatively referred to as a "system clock").

Figure 2A:
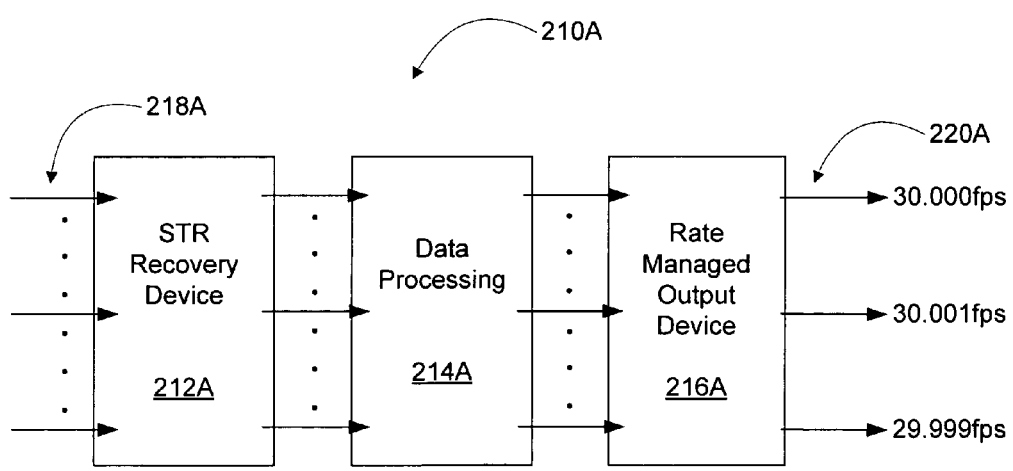
FIGS. 2A and 2B illustrate block diagrams of embodiments of an A/V decoder in accordance with the present invention.
Figure 2B:
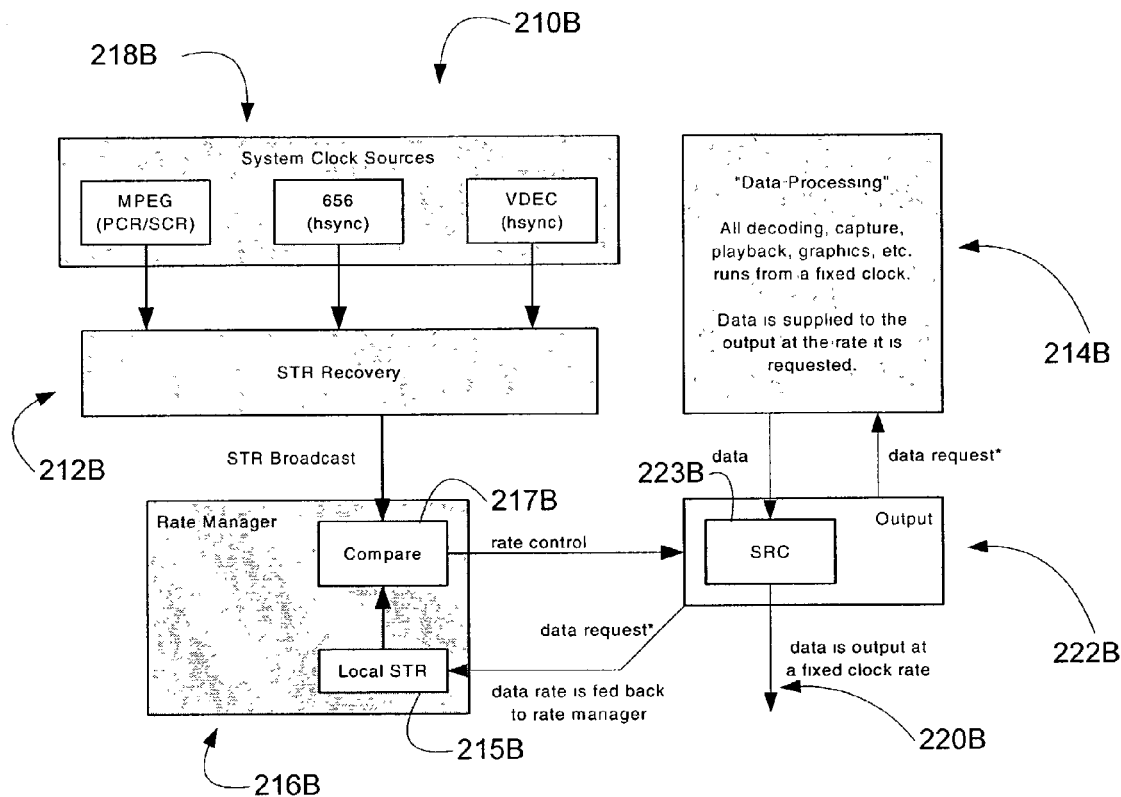

FIGS. 2A and 2B illustrate block diagrams of embodiments of an A/V decoder 210 in accordance with the present invention.

In an MPEG scheme currently used in A/V decoders, the system clock is locked to the PCR. For ITU656 video for example, currently available A/V decoders outputs one pixel every 2 clock cycles. The output pixel rate is locked to the system clock, and the system clock is locked to the incoming PCR values. However, in one embodiment of the present invention, the system clock is independent of the PCR values and the output pixel rate. A video SRC (digital sample rate converter) output requests data or pixels from the A/V decoder. In other words, the A/V decoder supplies or outputs data or pixels at the rate such data or pixels are requested (i.e., the data or pixels are "pulled" out of the A/V decoder even though the data or pixels are being "pushed" into the A/V decoder at a specifically defined rate). Similarly the audio SRC output requests audio samples at a specified rate from the audio decoder. The audio decoder provides samples as requested (i.e., the samples are pulled same as above, but with samples).

FIG. 2A illustrates a high level block diagram of one embodiment of an NV decoder, generally designated 210A, in accordance with one embodiment of the present invention. More detail about the AN decoder is provided in U.S. patent application Ser. No. 10/300,371 filed Nov. 20, 2002, titled "AN Decoder Having A Clocking Scheme That Is Independent Of Input Data Streams", the complete subject matter of which is incorporated herein by reference in its entirety. In the illustrated embodiment, the decoder 210A comprises a system time reference recovery device 212A (alternatively referred to as an "STR recovery device") having one or more input data streams 218A. It is contemplated that, in one embodiment, the STR recovery device 212A may comprise a digital PLL (where decoding multiple streams may comprise multiple PLLs) as provided below.

The STR recovery device 212A is illustrated communicating with an A/V data processing device 214A. In one embodiment of the invention, STR refers to a reference time value, a 43-bit reference time value for example. It is anticipated that different or more complex systems are contemplated. For example if the A/V decoder 210A has more than one data source, the decoder may include more than one STR recovery device, where the number of STR recovery devices may or may not correspond to the number of data sources.

In one example, the STR recovery device comprises an NCO based clock recovery device or system, where the NCO has a predetermined clock rate and increment value. Changing or adjusting the NCO increment value up or down effectively accelerates or decelerates the system time clock or STC as required.

As an alternative to the MPEG scheme, an A/V system incorporating an A/V decoder in accordance with the present invention may accept analog television signals as inputs. In this embodiment, the analog video input goes through, and is processed or decoded by, the A/V data processing device 214A, which may comprise a video decoder or VDEC. Likewise analog audio goes through, and is processed or decoded by, the A/V data processing device 214A which may further comprise a BTSC audio decoder (alternatively referred to as a "ADEC" or "BTSC").

In conventional decoders using VDECs/ADECs, the decoders lock the output rate to the input rate to process the data. Such conventional decoders lock a PLL/VCXO to the analog video line rate, and use this clock to control the video/audio A/D conversion and the output rate. This method requires a separate, unique clock for each analog input.

One embodiment of the present invention uses a system clock (a fixed system clock for example) to control the data processing. It is contemplated that the STR recovery device 212A may be locked to the analog video line rate. The analog hysncs are converted into a psuedo-STR using a simple counter in one embodiment. The STR recovery device 212A locks to this psuedo-STR and broadcasts the recovered STR to the rest of the decoder 210A. The broadcast STR is used to control the output rates as provided previously.

FIG. 2A further illustrates a rate managed output device 216A which is illustrated as communicating with the data processing device 214A. In the illustrated embodiment, the rate managed output device 216A has one or more A/V outputs 220A, which are output at the same or different rates. In FIG. 2A, three A/V outputs, generally designated 220A, are illustrated. For example, one A/V output is output at 29.999 frames per second (alternatively referred to as "fps"), one is output at 30.001 fps and one is output at 30.000 fps. The plurality of outputs in this FIG. 2A illustrate that a plurality of outputs are contemplated, where each of the outputs may be at different rates and/or illustrate that one or more may vary over time.

In one embodiment, the data processing device 214A bases audio and video processing on multiples of a single, fixed clock, a 27 MHz crystal clock for example. It is contemplated that, as a single fixed clock is used, the processing is not constrained by clock boundaries. Video and audio may be muxed between modules. It is further contemplated that the architecture may be made orthogonal, and easy to control.

In accordance with one embodiment, all data, including all audio and video data, is transferred using a "pull" model or mode, even though typical A/V streams (e.g., MPEG) are adapted to operate according to a push model or mode. The outputs request data as it is needed. Each module in the A/V decoder 210A may supply data to its outputs at the rate it is requested. Because a pull model or mode is used, the data processing clock (i.e., the system clock) is not tied to the input data rate. For example, the audio decoder may be clocked at 243 MHz, 133 MHz, or any other reasonable rate. The audio decoder clock does not need to "track" the input data rate.

Conventional A/V decoders use a VCXO or VCXO-PLL to lock the chip clock to the input data rate. However, one embodiment of the present invention uses rate managed output devices 216A and the associated SRC devices to change or adjust the video and audio output rates. It is contemplated that, when compared to currently available VCXO-based decoders, A/V decoders including exemplary rate manage output and SRC devices enable: fewer clock domains; fewer VCXOs; fewer PLLs; easier switching of data paths; easier scaling; and easier CPU control.

It is contemplated that, in one embodiment of the present invention, the output data rate tracks the STR. If the A/V decoder decodes multiple video streams, there may be multiple STRs. Each output data rate tracks an associated STR. The process of controlling the output rates may be called "rate management." In one embodiment, the rate managed output device 216A (alternatively referred to as a "output rate manager" or "output rate manager PLL"), comprising for example a digital PLL, is used to compare the output rate with the STR, and adjust the output rate accordingly, such that the output data rate matches the STR and the input data rate. In one embodiment the A/V decoder may include several output rate managers, one for each output of the A/V decoder.

It is contemplated that, in accordance with the present invention, the audio and video output rates might be adjusted in several ways. In one embodiment of the present invention, the rate managed output device 216A may use a VCXO-PLL or NCO for example to create a clock. Such clock could be used to clock the audio and video outputs, where the rate managed output device 216A adjusts the VCXO-PLL to change the output rate. Another embodiment of the rate managed output device 216A uses a sample rate conversion (alternatively referred to as "SRC") process, method or device to change or adjust the audio and video output rates.

FIG. 2B illustrates a block diagram of another embodiment of an A/V decoder, generally designated 210B, in accordance with one embodiment of the present invention. In the illustrated embodiment, the decoder 210B comprises an STR recovery device 212B having one or more input data streams 218B and a STR broadcast output.

In the illustrated embodiment, the input data streams (alternatively referred to as "system clock sources" or "system reference sources") 218B comprise an MPEG (PCR/SCR) stream, a 656 (hysnc) stream and a VDEC (hysnc) stream. While three input streams are illustrated, more complex systems, having more or different input data streams are contemplated. In the illustrated embodiment, the input time references are MPEG PCR/SCR values. However, for analog video or ITU656 video inputs, the hsync timing may be used as the time reference or a fixed timing reference may be used for PVR playback.

The STR recovery device 212B is illustrated as communicating (indirectly in this embodiment) with a data processing device 214B. In one embodiment, the SRT recovery device 212B controls the output data rates (in conjunction with a rate managed output and SRC devices). The data processing device 214B is adapted to decode, capture, play back and produce graphics, etc. from the data inputs (i.e., the input data streams 218B) using a fixed clock or timing reference. That is the data processing devices may decode, capture, play back and produce graphics, etc. using a fixed clock (i.e., the system clock for example). In one embodiment, the data is supplied to an output device or buffer 222B as requested (i.e., the output device requests data from the data processing device or the data is "pulled").

A rate managed output device 216B is illustrated as communicating (indirectly in this embodiment) with at least the data processing device 214B. More specifically, the rate managed output device 216B communicates with the STR recovery device 212B and the output device 222B. In the illustrated embodiment, the rate managed output device 216B comprises at least local STR and compare devices 215B and 217B respectively, while the output device 222B comprises at least an SRC device 223B.

In one embodiment, the output device 222B outputs data 220B at a fixed clock rate (i.e., the system clock rate) as it is requested. The output device 222B submits data requests to the data processing device 214B, and thus pulls the data. The data request is also submitted or mirrored to the rate managed output device 216B, where it is compared with the STR broadcast in the compare module 217B. A rate control signal is communicated to the output device 222B (specifically the SRC device 223B), ensuring that the data 220B is output at the fixed clock rate, and the output data rate matches the input data rate. The digital sample rate converter converts data from an input sample rate to an output sample rate. In one embodiment, the output sample rate may differ from the input sample rate. By adjusting the SRC parameters, the rate managed output device 216B changes the rate of the sample rate at the input of the SRC device 223B. This change to the sample rate changes the rate the data is requested from the data processing device 214B.

Figure 3:
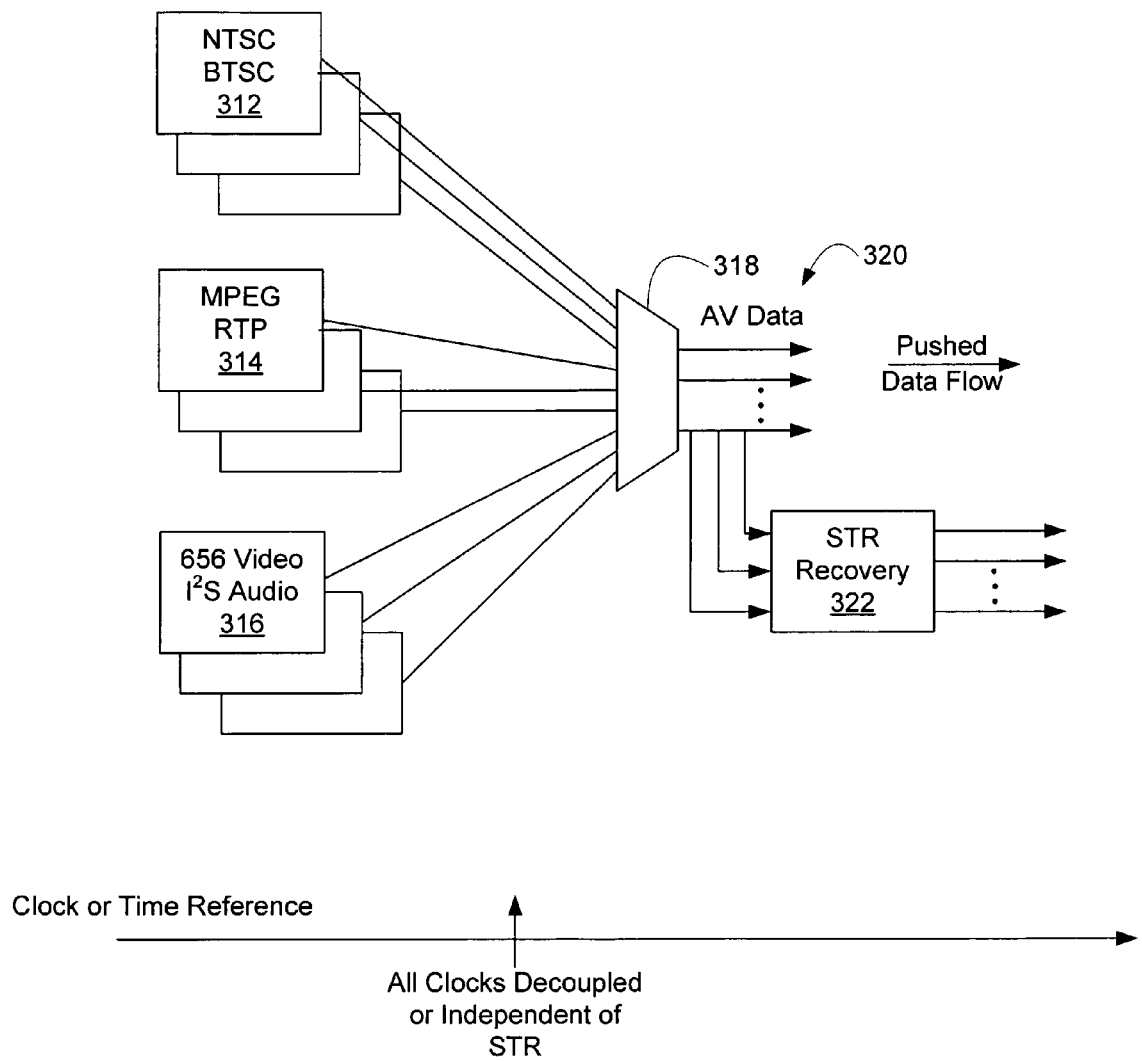
FIG. 3 illustrates a block diagram of an embodiment of the input data streams and the STR recovery device similar to that of FIGS. 2A and 2B in accordance with the present invention.

FIG. 3 illustrates a block diagram of an embodiment of the data input streams and the STR recovery device similar to that of FIGS. 2A and 2B in accordance with the present invention. More detail about STR recovery devices are set forth in U.S. Provisional Application No. 60/420,136 filed Oct. 22, 2002, titled "NCO Based Timebase Recovery System and Method for A/V Decoder", which is incorporated herein by reference in its entirety. A plurality of video and audio input data streams are illustrated, for example NTSC and BTSC streams, generally designated 312, MPEG and RTP streams, generally designated 314, and 656 and I²S streams, generally designated 316, are all illustrated as inputs to mux 318. While only one mux 318 is illustrated, two or more muxes are contemplated. Furthermore, while these input schemes are illustrated, other input streams, or different combinations thereof, are contemplated.

The mux 318 outputs a plurality of muxed A/V data in a pushed manner or mode, generally designated 320. It is contemplated that all the clocks associated with the input streams are decoupled or independent of the STR. The STR recovery device 322 outputs one or more system timing references or STR recovered from the A/V data.

Conventional decoders output data with VDACs/ADACs locked to the input rate as provided previously. For example, such decoders may lock a PLL/VCXO to the analog video line rate, and use this clock to control the video/audio A/D conversion. This method requires a separate, unique clock for each analog video input.

One embodiment of the present invention uses a system clock (a fixed system clock for example) to control the video/audio processing in the data processing device. The STR recovery device 322 is used to lock to the analog video line rate. The analog hysncs are converted into a psuedo-STR using a simple counter in one embodiment. The STR recovery device 322 locks to this psuedo-STR and broadcasts the recovered STR to the rest of the decoder. The broadcast STR is used to control (i.e., adjust or match) the output rates as provided previously.

Figure 4:
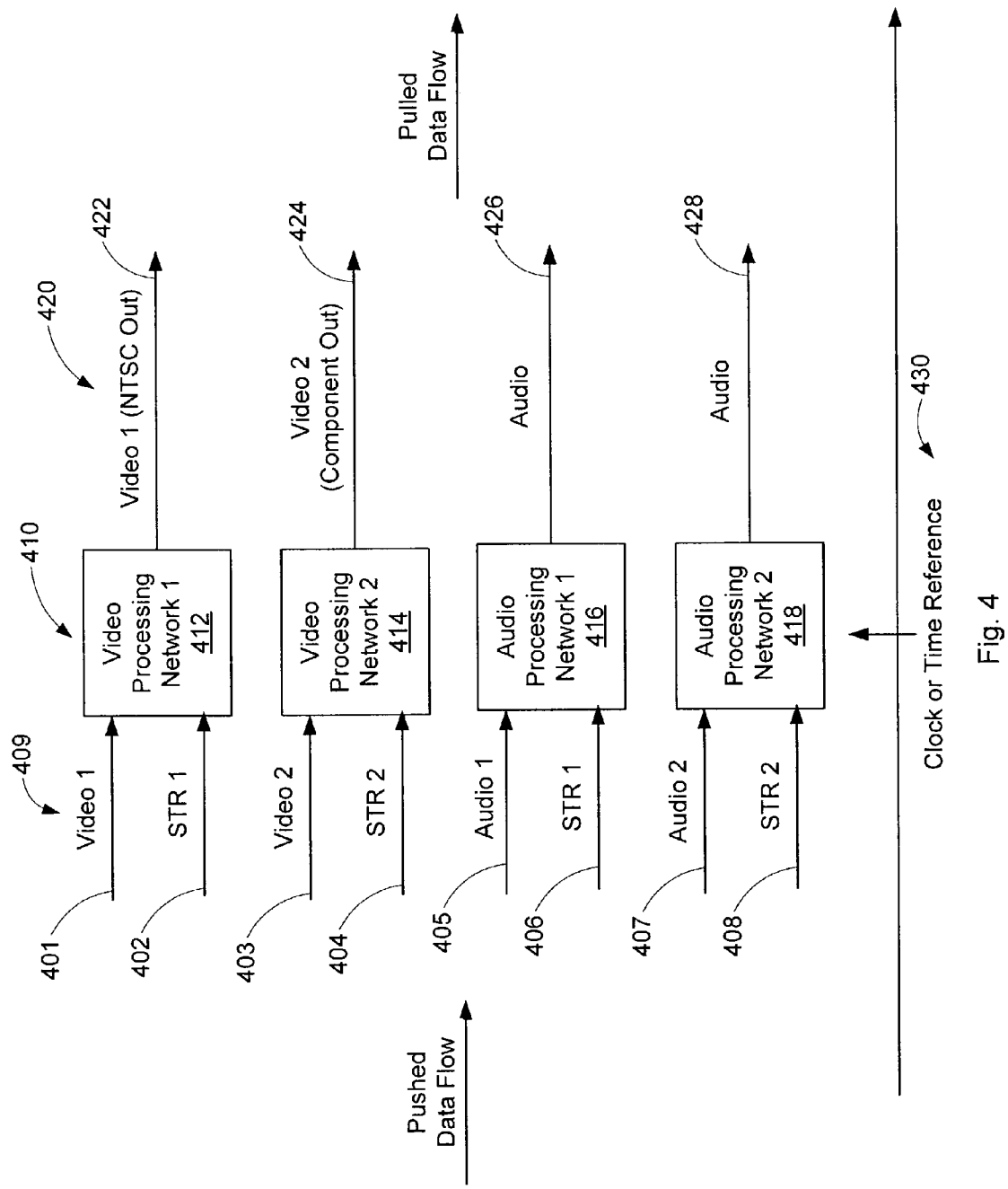
FIG. 4 illustrates a block diagram of an embodiment of the data processing device similar to that illustrated in FIGS. 2A and 2B, processing video data in accordance with the present invention.

FIG. 4 illustrates a block diagram of one embodiment of the data processing device, generally designated 410, similar to that illustrated in FIGS. 2A and 2B. In this embodiment, the processing device 410 is adapted to process audio and video data (at a fixed clock rate that is asynchronous to the time reference or time base of the input stream) in accordance with one embodiment of the present invention using pushed data flow input streams, generally designated 409. In the illustrated embodiment, the decoder 410 comprises a plurality of video and audio processing networks. In FIG. 4, two video processing networks designated 412 and 414 respectively, and two audio processing networks designated 416 and 418 respectively, are illustrated. It should be appreciated that while only two video and audio processing networks are illustrated, more (or less) than two video and audio processing networks or different process networks are contemplated.

In this embodiment, each of the processing networks of the data processing device 410 receives one or more inputs, generally designated 409, in a pushed manner or mode and provides an output, generally designated 420 in a pulled manner or mode, where the output is provided as requested. As illustrated, video processing network 412 receives a video stream and one or more STRs as inputs, designated 401 and 402 respectively, and provides one video output designated 422, NSTC out for example, in a pulled manner or mode at a fixed clock rate. Likewise, video processing network 414 receives a video stream and one or more STRs as inputs, designated 403 and 404 respectively, and provides one video output designated 424, component out for example, in a pulled manner at a fixed clock rate. In one embodiment, the video decoders compare a time stamp (PTS/DTS) with the STR to determine when to decode each frame and provide an output at a fixed clock rate.

Further, FIG. 4 illustrates two audio processing networks, Audio 1 and 2, 416 and 418 respectively. As illustrated, audio processing network 416 receives an audio stream and one or more STRs as inputs, designated 405 and 406 respectively, and provides one audio output designated 426 in a pulled manner at a fixed clock rate. Further, audio processing network 418 receives an audio stream and one or more STRs as inputs, designated 407 and 408 respectively, and provides one audio output designated 428 in a pulled manner at a fixed clock rate. In one embodiment, the audio decoder compares a time stamp (PTS/DTS) with the STR to determine when to decode each frame.

In the illustrated embodiment, the entire video path is clocked from a single clock 430 (i.e. the fixed clock rate which may be a 135 MHz clock for example). The A/V decoder utilizes STR recovery, STR devices and rate managed output devices to match the video outputs to the input data rates as provided previously. The transport module includes STR recovery and maintains the STRs (STRs 402, 404, 406 and 408 are illustrated) for each input source (streams 401, 403, 405 and 407 are illustrated). In one embodiment, these STRs are broadcast or transmitted to the one or more rate managed output devices.

In one embodiment of the present invention, it is contemplated that data processing device 410 may output several different formats of audio and video. For example, video may be output as analog (composite and/or components), digital ITU 656 and/or digital DVI. Audio may be output as analog, digital SPDIF, and/or digital I²S. The response time of the rate managed output devices keeps all the video and audio outputs tightly synchronized.

As provided previously, the A/V decoder of the present invention uses "pull" data flow. That is, data is pulled out of the data processing device as requested. In one embodiment, the video output path uses a video bus. Using a single 27 MHz crystal reference tends to reduce the number of clock domains.

Figure 5:
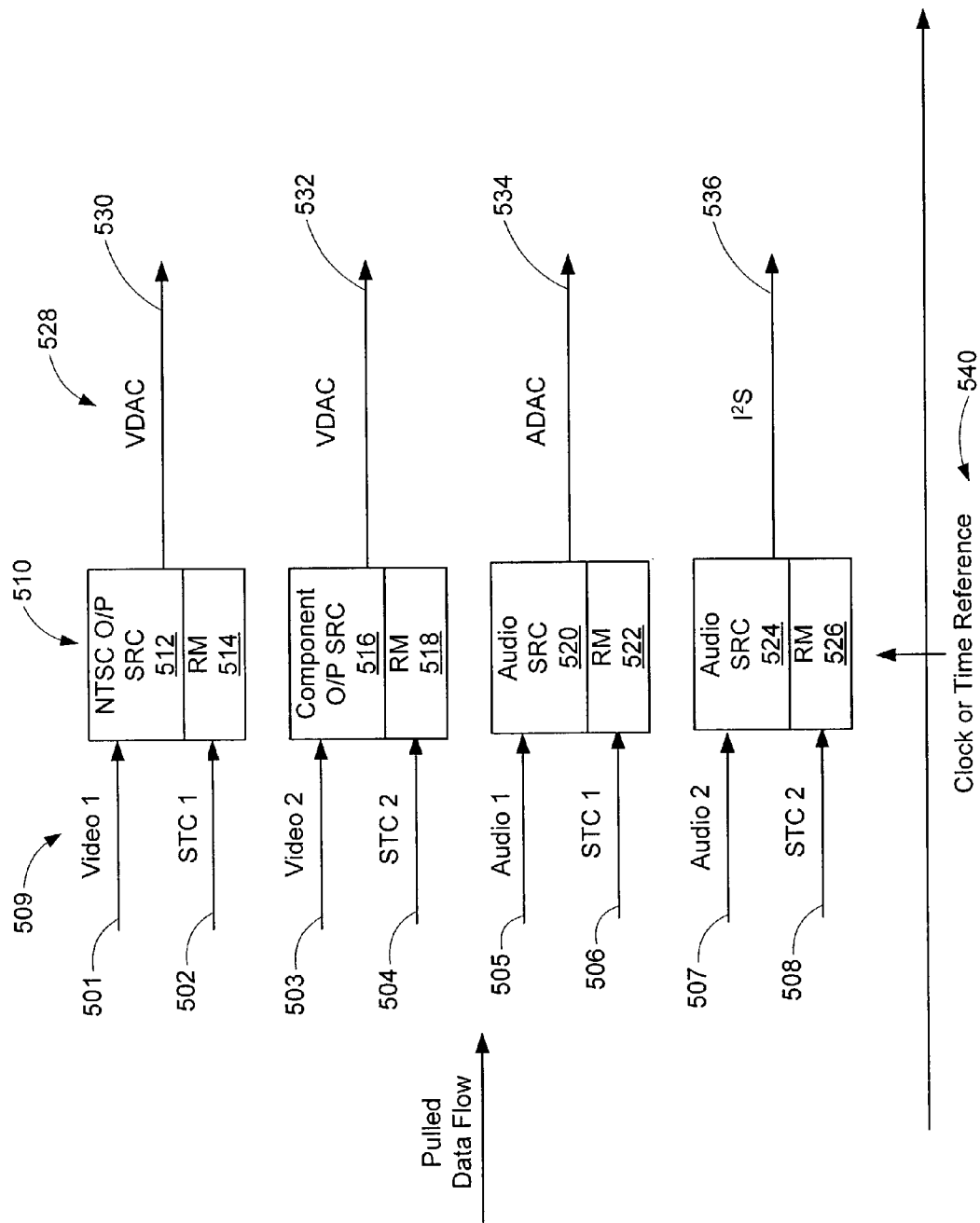
FIG. 5 illustrates a block diagram of an embodiment of the rate managed output device similar to that illustrated in FIGS. 2A and 2B, in accordance with the present invention.

FIG. 5 illustrates a block diagram of one embodiment of the rate managed output device 510 similar to that illustrated in FIGS. 2A and 2B using pulled data in accordance with the present invention. This device 510 includes an NSTR O/P SRC device 512 with an attached or associated rate management output device 514 (alternatively referred to as an "RM device"), a component O/P SRC device 516 with an associated RM device 518, an audio SRC device 520 with an associated RM device 522, and an audio SRC device 524 and associated RM device 526. In one embodiment of the present invention, the one or more SRC devices adjust the output data rates to track the system time references.

In this embodiment, each of the illustrated modules of the data processing device 510 receives one or more inputs, generally designated 509, in a pulled manner and provides an output, generally designated 528. The NTSC/OP SRC 512 has one video input 501 and the attached RM has a STR input 502. The output is VDAC 530. Component O/P SRC 516 has a video input 503 while its attached RM 518 has a STR input 504 and the output is VDAC 532. The audio SRC

520 has an audio input 505 while its attached RM 522 has a STR input 506 and the output is ADAC 534. The audio SRC 524 has an audio input 507 and its attached RM 526 has a STR input 508 and the output is I²s 536. All of the above modules are clocked from a single clock or time reference 540.

One embodiment of the present invention comprising a dual PLL structure uses a loop that locks the output sample rate to the system time reference. In this embodiment, the dual PLL, comprising a digital PLL that recovers the STR from the input timing references, is used to lock the output sample rates to the recovered STR. In this embodiment, the STR recovery PLL removes timing jitter and detects discontinuities, while the output rate manager PLL locks the output rate to the STR.

In this embodiment, the STR recovery PLL comprises a digital PLL that locks the sample request rate to the STR. In this case, the sample rate is related to the STR by 27/74.25=4/11. The STR recovery device maintains a local STR counter that increments by 4/11 every time a new sample is requested. The loop compares this local STR counter with the STR, and adjusts the sample rate converter appropriately.

In one embodiment, this loop works with any reasonable system clock speed. In this embodiment, the system clock is 108 MHz for example. When the loop is locked, the sample rate converter outputs 74.25/108=11/16 sample every clock. In other words, the SRC will request 11 inputs sampled every 16 system clocks. When the loop is locked, the rate control signal represents 11/16.

Figure 6:
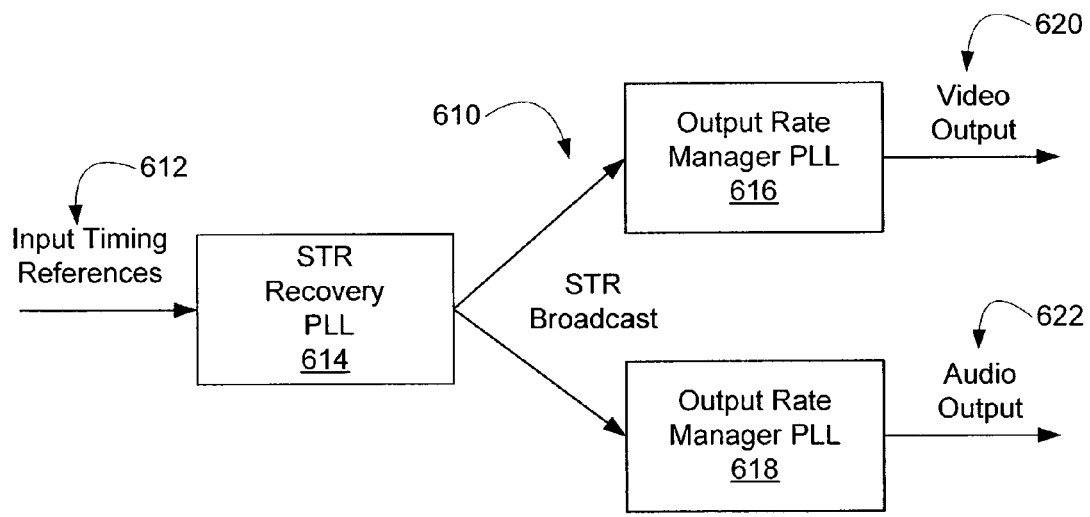
FIG. 6 illustrates a block diagram of one embodiment of a loop that locks the output sample rate to a system time reference comprising a dual PLL in accordance with the present invention.

FIG. 6 illustrates one embodiment of a loop, generally designated 610, that locks the output sample rate to the system time references. In this embodiment, a digital STR recovery PLL 614 recovers the STR from the input timing references 612. FIG. 6 illustrates the STR recovery PLL 614 communicating with dual PLLs, output rate manager PLLs 616 and 618 (alternatively referred to as "second-level PLLs") using an STR broadcast. In one embodiment, the STR recovery PLL 614 removes timing jitter and detects discontinuities.

In one embodiment, the video and audio output data 620 and 622 respectively are output by one or more SRCs where the output rate is managed by the output rate managers PLLs 616 and 618 and are locked to the STR. In this embodiment, the STR recovery PLL 614 is used to detect timing discontinuities and errors. If the STR recovery PLL 614 detects a discontinuity, it locks to the new time base and notifies the second-level PLLs of the discontinuities. This ensures that both the video and audio outputs 620 and 622 will have similar responses to the discontinuity.

It is contemplated that the audio and video may be output in several different formats. Video may be output as analog data (composite and/or components), digital ITU 656 and/or digital DVI. Audio may be output as analog, digital SPDIF, and/or digital I²S. The response time of the output PLLs maintains tight synchronization for the outputs. The STR recovery PLL 614 is used to remove jitter from the time references as previously provided. Because the jitter may be large and the time references relatively infrequent, the STR recovery PLL 614 has a very slow response to changes at the input. The output rate manager PLLs 616 and 618 however receives the jitter-free STR from the STR recovery PLL 614. The output rate manager PLLs 616 and 618 have a faster response time (in comparison to the STR recovery PLL) and quickly track changes. In this manner, the audio and video outputs 620 and 622 quickly and closely track the STR from the STR recovery PLL 614. It is contemplated that the video and audio outputs are tightly synchronized.

If each output PLL 616 and 618 were locked directly to the input timing reference 612, the output PLLs would have a slow response time. The audio and video outputs 622 and 620 would not be tightly synchronized, and there might be large timing differences between different outputs.

It is contemplated that the STR recovery PLL 614 is a convenient place to add CPU control of the A/V decoder. The CPU (not shown) may be used to adjust the STR recovery PLL 614, such that all outputs automatically (and synchronously) track the changes. Changes to the STR may be useful for personal video recorder (alternatively referred to as "PVR") operation or for STR-based modes like pause and fast forward.

In accordance with the present invention, one or more sample rate conversion or STR recovery devices are used to convert one or more input samples from the system time reference or STR rate to the system clock. It is contemplated that the STRs and the system clock may be different, are independent and not locked (i.e., are asynchronous to each other). It is further contemplated that STRs and the system clocks may drift slowly apart over time. In accordance with one embodiment, the one or more STR devices adjust for any differences between the STRs and the system clocks.

In known MPEG schemes, the system clock is locked to the STR, while for ITU656 video, the video decoder outputs one pixel every two clock cycles. As the STR clocks the video decoder, the output pixel rate is locked to the STR. However, in accordance with one embodiment of the present invention, the system clock is independent of or asynchronous to the STRs. Furthermore, in this embodiment the video SRC outputs requested pixels or data at the proper rate (i.e., as needed) from the video decoder. The video decoder supplies pixels or data to the SRC device at the rate such pixels are requested. In other words, the SRC converts pixels, data or other samples received in a push format at the receiver and supplies the pixels, data or other samples in a pull or requested format or manner.

Known VCXO-based video systems (See the example illustrated in FIG. 1) use synchronous dataflow. For video, a feeder in the VCXO-based video systems outputs pixels at 13.5 MHz. The compositor accepts one video and one graphics pixel every 13.5 MHz clock, such that the compositor outputs one composited pixel every 13.5 MHz clock.

Such synchronous dataflow in VCXO-based systems require all modules in the datapath be synchronized to a master timing controller (alternatively referred to as a "CRTC"). Data from all sources to such systems (e.g., graphic feeders) must arrive at the VEC at the correct clock cycle synchronized to the CRTC. Any processing delays in such systems caused by scalers, c/p, compositors, etc. must be compensated for. If the compensation is not correct, artifacts (color swap for example) may appear at the system output.

The synchronous dataflow in such VCXO-based assumes that the system clock matches the output clock. However, in systems with multiple video streams, clocking or timing the video elements is complicated. It is contemplated that a scaler clocked by one VCXO in the video system may not work with a feeder clocked by a second VCXO.

In accordance with the present invention, A/V data is transferred with a "pull" model. Video data is transferred using a "video bus" protocol. In the pull model, each block or module requests or pulls data from earlier blocks or modules. The data rate is controlled by the A/V output. It is contemplated that, as rate managed output devices act on the system outputs, only the outputs know the correct data rates.

In accordance with the present invention, it is contemplated that an exemplary scheme supporting a pull model has many benefits. Scalers, compositors, mixers, and feeders in the A/V decoder may be clocked at any rate, as long as the system clock is adapted to service the pull requests. Most processing elements do not need to worry about the output timing, or the processing delay. Furthermore, the pull model enables rate managed outputs using a rate managed output device as provided previously and as set forth in U.S. Provisional Application No. 60/420,344 filed Oct. 22, 2002 titled "Data Rate Management System and Method for A/V Decoder", which is incorporated herein by reference in its entirety.

It is contemplated that, the scheme and method adapted to support pull dataflow generally does not change the fundamental method for A sync. Audio & video decoders (e.g., RAPTOR, MVP, Titan, ADP) checks PTS/DTS time stamps for lip sync, and for MPEG buffer compliance.

It is further contemplated that, in accordance with the present invention, STR broadcasts occur very frequently (at least 100 kHz for example). This simplifies PTS/DTS comparison for the A/V decoders, because such decoders do not need local STR counters. The A/V decoders compare the PTS/DTS values with the latest STR broadcast.

In one embodiment, when the A/V decoders compare PTS/DTS timestamps with the STR, an offset value (alternatively referred to as an "STR offset") is used. The STR offset may be programmed by a main CPU using such STR offset enabling audio timing be moved relative to video timing by changing the audio STR offset relative to the video STR offset. Furthermore, some outputs (e.g., SPDIF) require different timing than other outputs (e.g., I²S). These differences may be realized with different STR offsets. Additionally, the time from decode to display may change due to capture/playback. This time may be compensated using STR offsets.

In one embodiment, an STR threshold is used to add some hysteresis to the PTS/DTS comparison. This may prevent oscillations of ahead by ½ frame, behind by ½ frame, ahead by ½ frame, behind by ½ frame, etc.

It is contemplated that A/V decoders balance the requirements of the pull dataflow model with the requirements of A/V sync. In general, the A/V sync requirements (PTS/DTS comparisons) are high priority. These comparisons are required by MPEG specifications and standards, and must be followed. The audio/video decoders may skip/repeat frames to maintain A/V sync, and to keep the output buffers from underflow/overflow.

Figure 7:
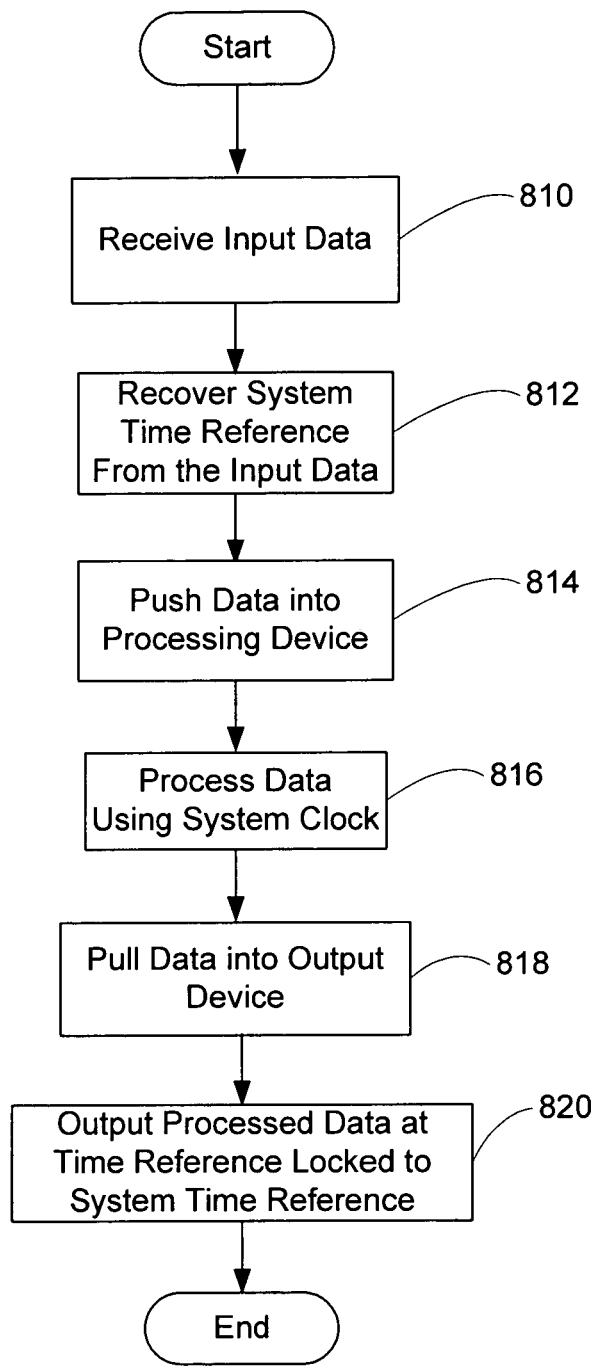
FIG. 7 illustrates one embodiment of a flow diagram for a method of processing data in accordance with one embodiment of the present invention.

FIG. 7 illustrates one embodiment of a flow diagram for processing data in data stream using an A/V decoder having a system supporting a pull data flow scheme in accordance with the present invention. More specifically, one embodiment of the present invention relates to a method of processing data using a clock that is asynchronous to a system time reference using a system supporting a pull data flow scheme. In the illustrated embodiment, the data is received, in one embodiment using a receiver, as illustrated by block 810. A system time reference is recovered from the received data as illustrated by block 812. In this embodiment, the system time reference is recovered from the data using a STR recovery device as provided previously.

The data is pushed into one or more processing devices as illustrated by block 814. The data is processed as illustrated by block 816 using a fixed clock. In one embodiment, the data is processed (decoded, captured, played back, graphics produced, etc.) using a fixed clock that is asynchronous to the system time reference. The processed data is then pulled into an output device using a system supporting a pull data flow scheme as illustrated by block 818. In one embodiment, such system comprises a system similar to that illustrated in FIG. 7. The processed data is output at a time reference that is locked to the system time reference as illustrated by block 820.

Figure 8:
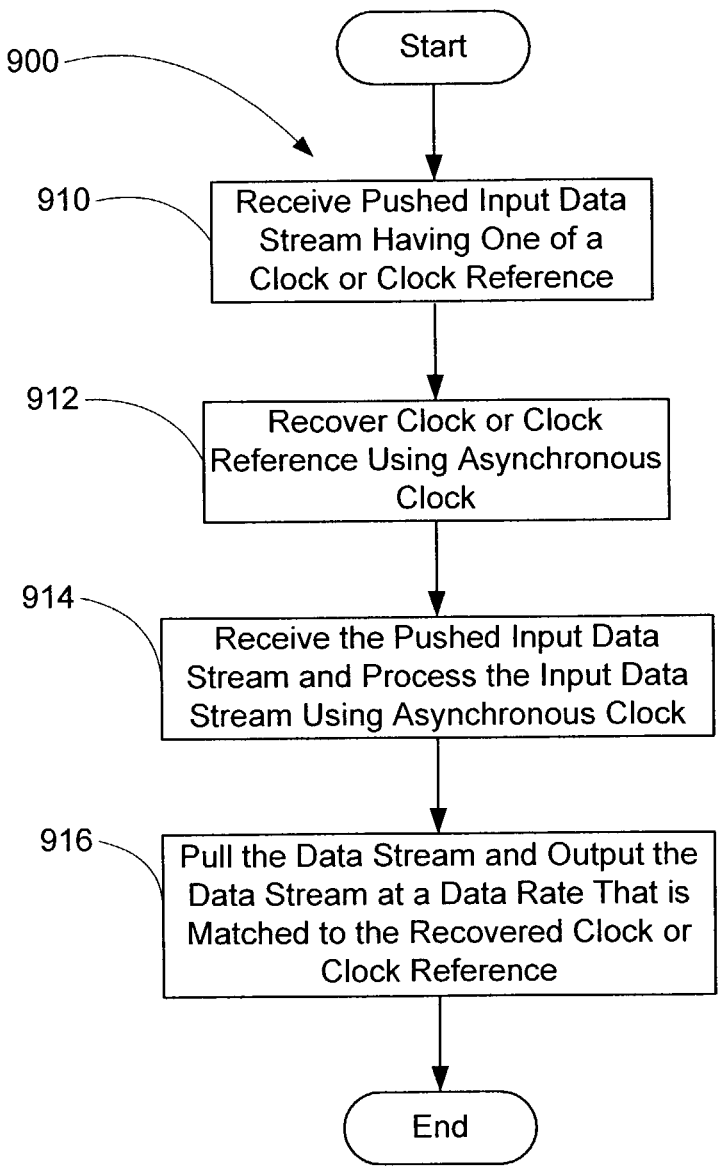
FIG. 8 illustrates one embodiment of a flow diagram for supporting pull data flow in accordance with one embodiment of the present invention.

FIG. 8 illustrates one embodiment of a flow diagram for pulling the data stream at a data rata that is locked to a recovered clock or clock reference using an A/V decoder having a system or method supporting a pull data flow scheme in accordance with the present invention. In accordance with the present invention, the method, generally designated 900, comprises receiving one or more pushed input data streams having one of a clock or clock reference as illustrated by block 910. In this embodiment, the clock or clock reference is recovered using an asynchronous clock or clock reference as illustrated by block 912.

Method 900 further comprises receiving the pushed input data stream and processes it using one of the asynchronous clock or clock references as illustrated by block 914. Finally, method 900 comprises pulling the data stream using a system (similar to that illustrated in FIG. 7) supporting a pull data flow scheme and outputting the data stream at a rate that is matched to the recovered clock or clock reference as illustrated by block 916.

Many modifications and variations of the present invention are possible in light of the above teachings. Thus, it is to be understood that, within the scope of the appended claims, the invention may be practiced otherwise than as described hereinabove.

The invention claimed is:

1. A method of transferring a data stream comprising:
    recovering, with a recovery device, a system time reference from each of a plurality of data streams based on predefined timing information in the plurality of data streams, the plurality of data streams having different system time references;
    processing, with an A/V decoder configured to receive input data and decode the input data to generate a plurality of decoded output data streams, each of the plurality of data streams using a system clock asynchronous to the corresponding system time reference recovered from each of the plurality of data streams, wherein the system clock is independent of each system time reference and input data rate of each data stream;
    requesting, with an output device, each of the plurality of decoded output data streams from the A/V decoder at an output data rate according to data requests;
    comparing, with an output rate manager, the output data rate of each decoded output data stream from the A/V decoder with a corresponding system time reference;
    adjusting, with the output device, the output data rate of each decoded output data stream from the A/V decoder to match the output data rate to the corresponding system time reference; and
    individually controlling, with the output device, the output data rate of each of the plurality of decoded output data streams from the A/V decoder corresponding to the plurality of data streams having the different system time references using the recovered system time references and the single system clock asynchronous to the system time references.

2. The method of claim 1, further comprising controlling the output data rate of each of the plurality of decoded output data streams at least in part by an output data rate of the A/V decoder.

3. The method of claim 1, further comprising detecting discontinuities in the predefined timing information.

4. The method of claim 3, further comprising, when detecting a discontinuity in the predefined timing information, locking to a new time base and notifying the output rate manager of the discontinuity.

5. The method of claim 1, wherein the system clock comprises a fixed clock asynchronous to the system time references and independent of the predefined timing information.

6. A method of processing video data in an A/V decoder configured to receive input data and decode the input data to generate a decoded output video data stream, the method comprising:
  recovering a system time reference for each of a plurality of data streams based on predefined timing information in the plurality of data streams, the plurality of data streams having different system time references;
  processing, with a data processing module of the A/V decoder, the plurality of input streams using a system clock asynchronous to the system time references, wherein the system clock is independent of the system time references and an input data rate of each data stream;
  pulling, with an output device, a plurality of decoded output video data streams from the data processing module of the A/V decoder via a data request, the data request indicating an output data rate of each of the plurality of decoded output video data streams;
  comparing, with an output rate manager, the output data rate of each decoded output video data stream with the corresponding system time reference;
  generating a rate control signal based on the comparison of the output data rate and the corresponding system time reference;
  adjusting, with the output device, the output data rate of each decoded output video data stream to match the output data rate to the corresponding system time reference using the rate control signal, wherein the output data rate is independent of the system clock; and
  individually controlling the output data rate of the plurality of decoded output data streams from the A/V decoder corresponding to the plurality of data streams having the different system time references using the recovered system time references and the single system clock asynchronous to the system time references.

7. The method of claim 6, the step of comparing the output data rate of each decoded output video data stream with the corresponding system time reference comprising comparing the output data rate with the corresponding system time reference using a digital phase locked loop.

8. The method of claim 6, further comprising detecting discontinuities in the timing information.

9. The method of claim 8, further comprising, when detecting a discontinuity in the timing information, locking to a new time base and notifying the output rate manager of the discontinuity.

10. The method of claim 6, wherein the system clock comprises a fixed clock asynchronous to the system time references and independent of the timing information.

11. An A/V decoder adapted to process data, comprising:
  a processing device configured to receive a plurality of data streams including predefined timing information pushed into the A/V decoder;
  a recovery module adapted to recover a system time reference for each of the plurality of data streams based on the predefined timing information using a system clock asynchronous to the system time references, wherein the system clock is independent of the system time references and an input data rate of each data stream, the plurality of data streams having different system time references;
  a conversion module adapted to convert each of the plurality of data streams from a push format to a pull format using the system clock;
  an output device configured to output a plurality of decoded data streams according to the pull format and an output data rate of each decoded data stream based on a data request; and
  an output rate manager that compares the output data rate of each decoded data stream with the corresponding system time reference and adjusts the output data rate at which to output each decoded data stream to match with the corresponding system time reference, wherein the output rate manager is configured to individually control an output data rate of a plurality of decoded output data streams from the A/V decoder corresponding to the plurality of data streams having the different system time references using the recovered system time references and the single system clock asynchronous to the system time references.

12. The decoder of claim 11, further comprising a process module adapted to process the plurality of data streams.

13. The decoder of claim 12, wherein the process module is further adapted to process the plurality of data streams using the system clock asynchronous to the system time references.

14. The decoder of claim 12, wherein the process module is adapted to at least decode the plurality of data streams.

15. The A/V decoder of claim 11, wherein:
  the recovery module comprises a first level phase locked loop adapted to detect discontinuities in the predefined timing information; and
  the output rate manager comprises a second level phase locked loop adapted to lock the data request to the corresponding system time reference.

16. The A/V decoder of claim 15, wherein the first level phase locked loop is further adapted to, when detecting a discontinuity, lock to a new time base and notify the second level phase locked loop of the discontinuity.

17. The A/V decoder of claim 11, wherein;
  the output device comprises a plurality of output devices clocked by a single system clock; and
  the output rate manager comprises a plurality of output rate managers.

18. The A/V decoder of claim 11, wherein the system clock comprises a fixed clock asynchronous to the system time references and independent of the predefined timing information.

* * * * *